Nov. 18, 1930.   J. G. FUNK   1,781,837
COMBINATION KITCHEN UTENSIL
Filed Jan. 17, 1929
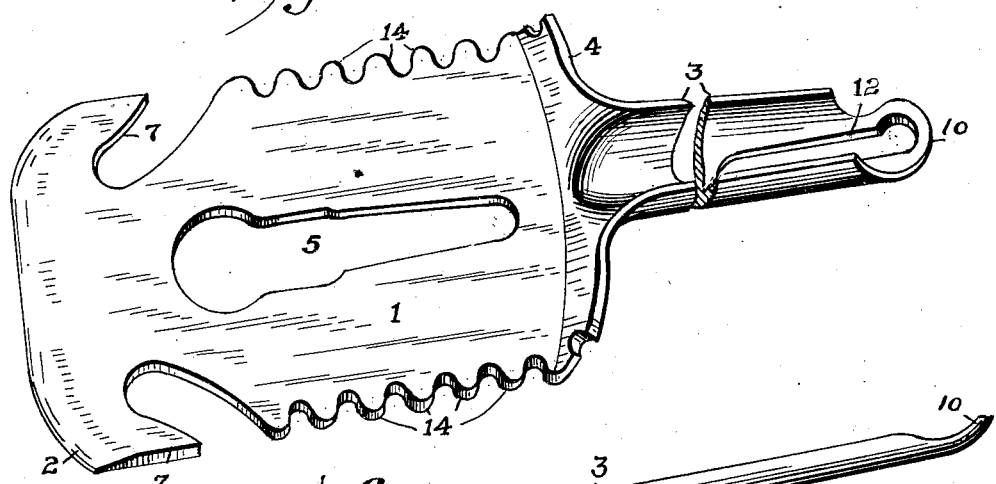
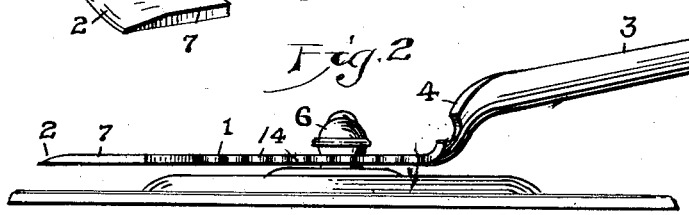
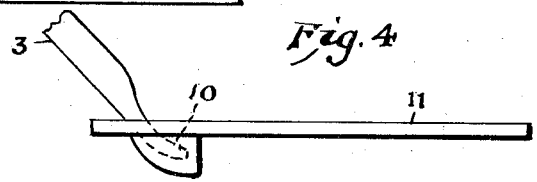
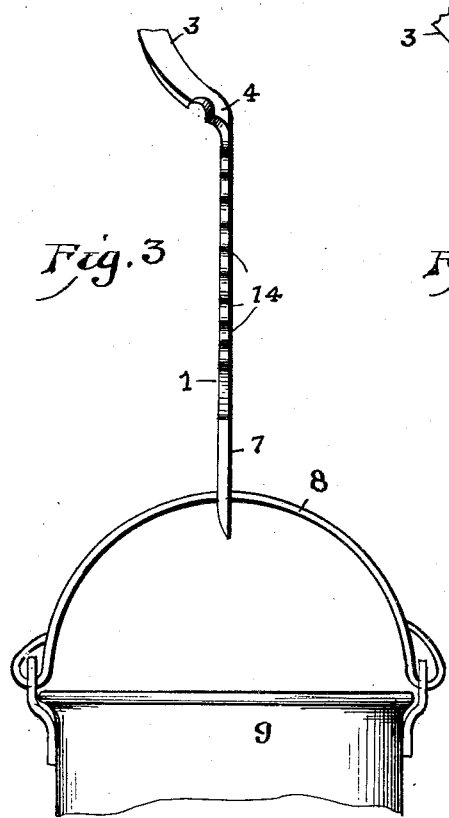
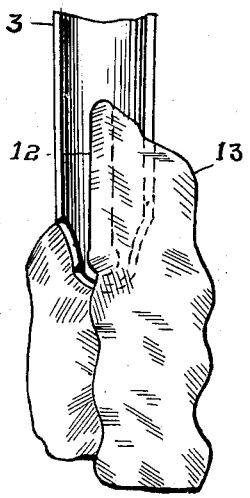
INVENTOR Patented Nov. 18, 1930

1,781,837

UNITED STATES PATENT OFFICE

JOHN G. FUNK, OF CLEVELAND, OHIO

COMBINATION KITCHEN UTENSIL

Application filed January 17, 1929. Serial No. 333,170.

In modern housekeeping the kitchen or kitchenette space available is becoming more and more limited, and there is a very marked advantage in providing a combination utensil which may be conveniently employed for a plurality of purposes.

The object which I have in view is the provision of a utensil which combines in a compact and convenient form means for performing a large number of kitchen purposes and which may be manufactured and sold at a relatively small price.

Thus my improved utensil is arranged for employment for lifting grates, grids, cooking utensils, pots, casseroles and pans, either with or without bails and the lids and covers of the same; for lifting stove lids and the like; for washing bottles and other hollow ware; for pounding meat to make the latter tender and juicy, and for many other kitchen and household purposes.

In the accompanying drawings wherein I have illustrated the best embodiment of the principles of my invention now known to me, Fig. 1 is a broken perspective of the combination utensil.

Fig. 2 is a side elevation of the utensil on reduced scale, the same being shown in use for lifting a pot lid.

Fig. 3 is a broken side elevation showing the utensil employed to lift a bailed pot.

Fig. 4 is a broken side elevation showing the utensil employed as a stove-lid lifter.

Fig. 5 is a broken view showing the utensil arranged for use as a washer for bottles and other hollow ware.

Referring to the drawings, the utensil is preferably cut and pressed in shape from a metal plate and may be nickeled or otherwise finished.

The front portion of the utensil is a flat plate-like portion 1 whose front end is preferably arcuate and beveled downwardly as at 2 so that the utensil may be conveniently slipped under a pot, casserole or other object for lifting the latter.

Extending rearwardly from the rear of the portion 1 is the handle 3 which preferably inclines upwardly from the plane of the portion 1 and is of trough-like cross-sectional shape so as to be comfortably grasped by the hand of the user.

The rear edge of the portion 1 at either side of the handle 3 is arcuate and provided with an upturned flange 4 to limit the degree of insertion of the portion 1 under a pot or the like and to provide an abutment against which the latter may bear when being lifted by and carried on the utensil.

The handle 3 is preferably integral with the portion 1 of the utensil.

The portion 1 is provided with a key-hole opening or slot 5 with its enlarged end toward the front of the portion 1. The slot tapers toward the rear.

The slot 5 is used, as illustrated in Fig. 2, to grasp the knob 6 of a lid of a pot or the like to lift the lid, the large end of the slot being first let down over the knob and the utensil being then moved forwardly until the converging sides of the slot grip the neck of the knob.

At the front end of the portion 1 the side edges of the plate are cut away to form the hooks 7 by means of which the bail 8 of a pot or the like 9 may be grasped, as shown in Fig. 3, to raise the pot.

At the free end of the handle, the side walls thereof are cut down and the extremity slightly upturned as at 10 to enable the end of the handle to be hooked into the lifter hole of a stove lid 11, as illustrated in Fig. 4, so that the utensil may be used as a stove-lid lifter.

The free end of the handle is provided with an elongated or slotted opening 12 through which a rag 13 may be threaded, to arrange the utensil for use as a washer for bottles and other hollow ware and also as a dish-mop.

The sides of the portion 1 and the ends of the flanges 4 are serrated to form the teeth 14 so that the utensil may be employed for pounding and tendering tough steak and other meats.

Many other uses for my improved utensil will suggest themselves to one familiar with kitchen and household practices and requirements.

It is evident that my improved utensil is of great value to the housekeeper, and that it may be made and sold at a price which is within the reach of all to whom it would be useful.

What I desire to claim is:—

1. A kitchen utensil comprising a flat plate portion adapted to be inserted under pots and the like, the side of the plate portion being cut away to form hooks to engage the bails of pots and the like, the plate portion being provided with a slotted opening to grasp the knobs of lids and the like, and a handle connected to the rear end of the plate portion.

2. A kitchen utensil comprising a plate portion adapted to be inserted under pots and the like, the sides of said plate portion being serrated for pounding meat and the like, said plate portion being provided with a slotted opening for grasping the knobs of lids and the like, and a handle extending rearwardly from said plate portion.

3. A kitchen utensil comprising a plate portion adapted to be inserted under pots and the like, and a handle extending rearwardly from the plate portion, said handle being slender and substantially straight sided so as to be inserted into a bottle, the free end of the handle being provided with a longitudinally slotted opening for threading a rag therethrough for the purpose described.

Signed at Lakewood, Ohio, this 24th day of December, 1928.

JOHN G. FUNK.